ns

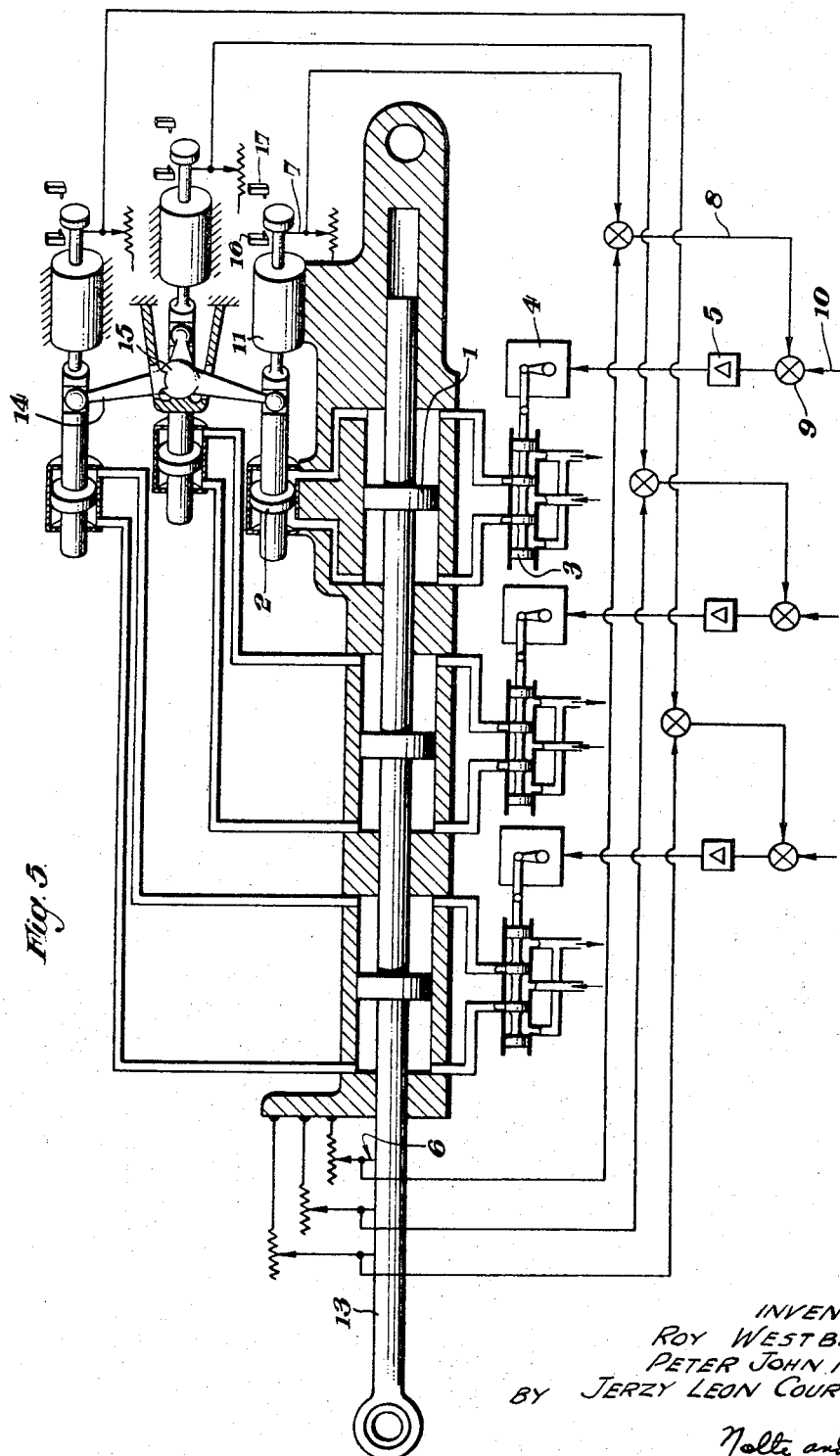

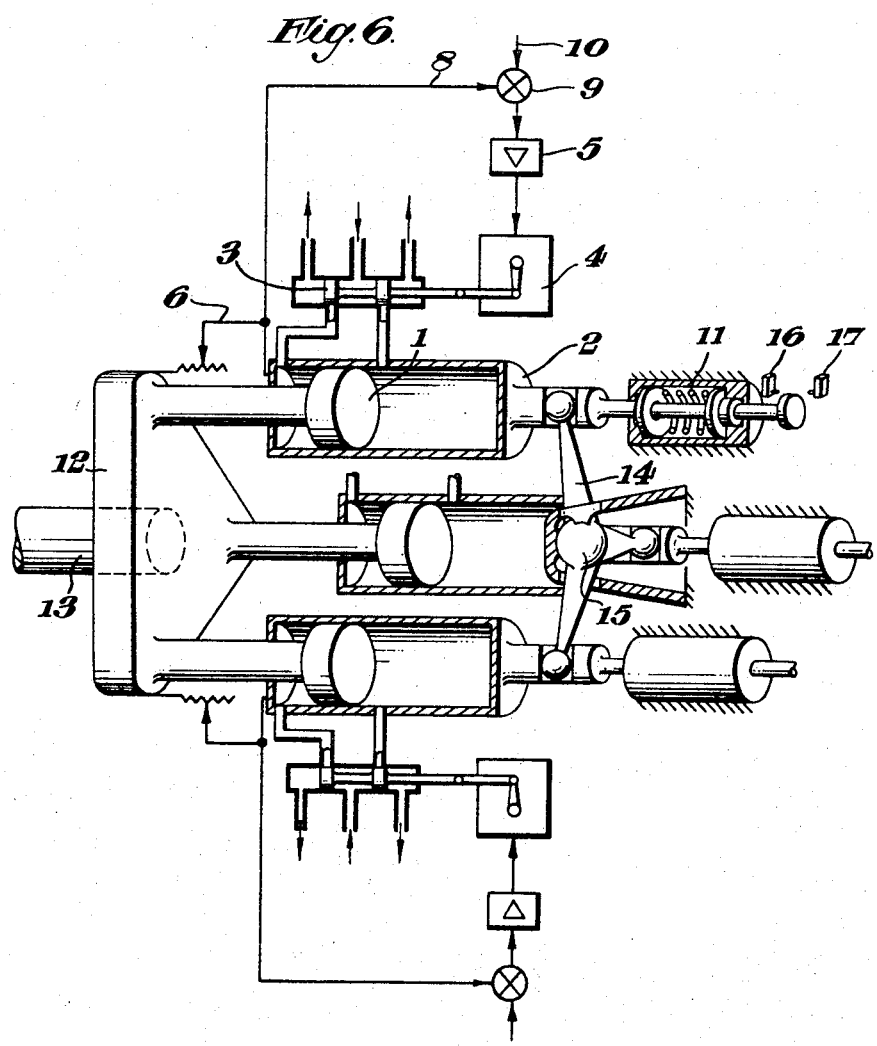

United States Patent Office 3,411,410
Patented Nov. 19, 1968

3,411,410
POSITION CONTROL SERVO SYSTEMS
Roy Westbury, Bridgnorth, Peter John Maltby, Codsall, and Jerzy Leon Courtenay, Wolverhampton, England, assignors to H. M. Hobson Limited, London, England, a company of Great Britain
Continuation of application Ser. No. 471,507, July 7, 1965. This application Aug. 4, 1967, Ser. No. 658,576
Claims priority, application Great Britain, July 7, 1964, 28,010/64
19 Claims. (Cl. 91—1)

ABSTRACT OF THE DISCLOSURE

Position control servo especially for aircraft controls having three actuators, each including a relatively movable member which between them provide an output displacement which is a function of an input signal applied to the actuators. There is a comparison means for comparing the output displacement with the input signal and correcting any discrepancy between them. The present system provides increased reliability in that if one of the actuators fails the others may still impart the required movement to the aircraft control surface.

---

This application is a continuation of application Ser. No. 471,507, filed July 7, 1965, now abandoned.

This invention relates to position control servo systems, in particular for an aircraft control surface, of the kind comprising three actuators each including relatively movable members which provide between them an output displacement which is a function of an input signal applied to the actuators and means for comparing the output displacement with the input signal and correcting any discrepancy between them.

The purpose of systems of this kind is to provide increased reliability of operation by the provision of a multiplicity of channels so that in the event of a failure of one of these channels it is still possible to impart to the control surface a movement which is acceptably representative of an input signal demand. In such a system, the mechanism may be required to have a high positional accuracy from which only a limited deviation is acceptable in the event of a channel failure.

Figure 1:
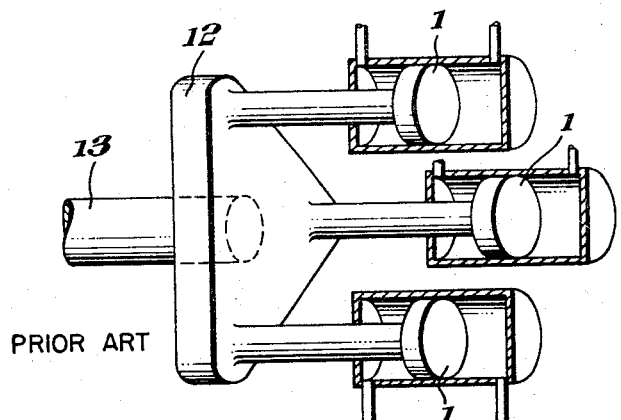
Figure 2:
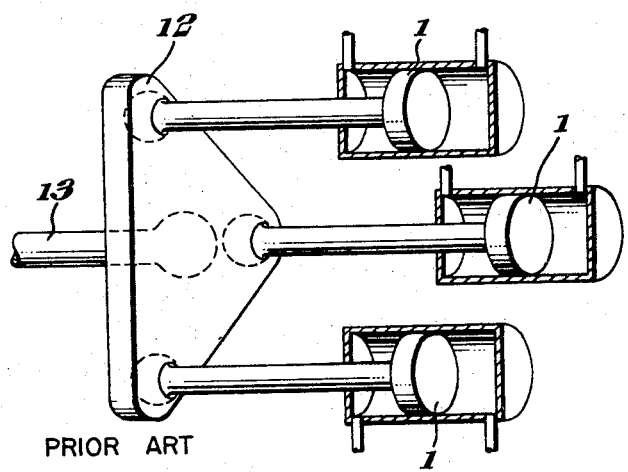

Two known systems of this kind are shown diagrammatically in FIGS. 1 and 2 of the accompanying drawings. As will be seen, each of the systems includes three actuators, each having a servo piston 1 which is movable in a fixed cylinder. In the case of FIG. 1, the three servo pistons are rigidly attached to a triangular beam 12 which, in turn, is fixed to an output member 13 common to the actuators. The construction of FIG. 2 differs in that the servo pistons 1 are attached to the beam 12 by universal joints.

In systems such as those shown in FIGS. 1 and 2 there may be a difference in the demanded position of the actuators owing to manufacturing tolerances in the elements of each channel. A typical difference resulting from manufacturing tolerances is in the region 10% of the available movement of an actuator whilst a channel failure could result in either no movement or maximum movement.

The two systems have different characteristics.

In the system shown in FIG. 1, which can be regarded as a force addition system, a difference in the demanded positions of three servo pistons can result in a condition such that the demands of two of the actuators cancel each other on a force basis, leaving the third actuator with an intermediate demand to determine the output displacement. This intermediate demand may or may not be the average of the three demands.

In the event of a failure in one channel resulting in a hard over position demand, there may be no change in the output position or it may be limited to the difference between the remaining channels.

A limitation of this system is that in the event of certain forms of failure in one channel, including loss of fluid supply or failure of the input signal, an output positional dead zone equal to the difference between the demanded positions of the servo pistons in the remaining channels will appear. This is because the remaining channels are opposed to each other on a force basis due to slightly different demanded positions of their servo pistons resulting from differences within manufacturing tolerances and their final position is therefore indeterminate within the difference range of the two demanded positions. A further limitation is that faults can be detected only by comparison of electrical signals and comparison of servo valve positions. Since servo valve displacements may be extremely small such comparison is particularly difficult. Accordingly this system may be improved by the introduction of pre-loaded spring boxes as described in British patent specification No. 1,012,727. These provide for fault indication but not for the elimination of the aforementioned dead zone. Furthermore, the spring boxes are required to transmit very heavy loads and accordingly they and their operating linkage may be unwieldly.

In the system of FIG. 2, which is an average coupling system, the output displacement is always the average of the three channel positions, so that the system is inherently free from the above mentioned dead zone. Also fault tindication can be obtained from the different displacements of the servo positions, which are not rigidly coupled together as in FIG. 1. However the value of the system is limited because in the event of a "hardover" failure in one channel, one third of the disturbance appears at the output member.

The present invention provides a positional control servo system of the above kind, in which one relatively movable member of each actuator is rigidly connected to an output member common to the three actuators and the other relatively movable member of each actuator is coupled to a displacement averaging mechanism, the maximum relative displacement of said other movable member of each actuator corresponding substantially to the maximum tolerable difference between any two demand input signals.

Certain embodiments of the invention are shown diagrammatically in FIGS. 3–6 of the accompanying drawing.

Figure 3:
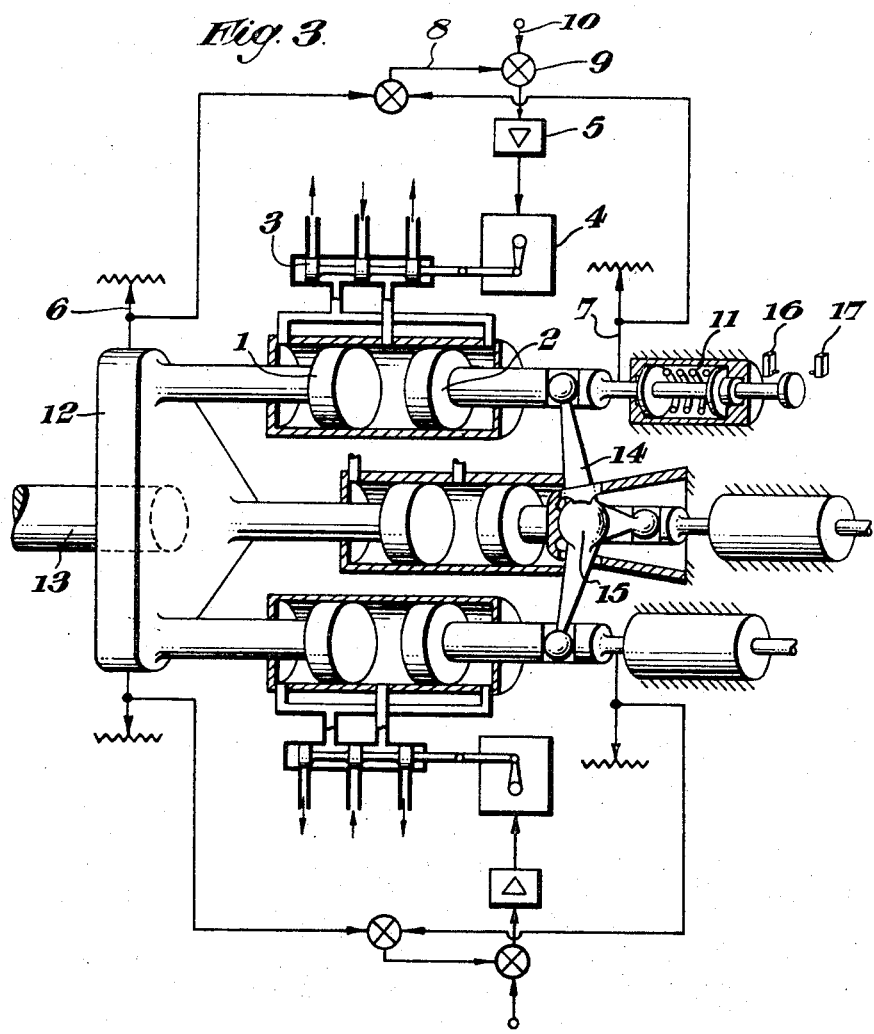

In the system shown in FIG. 3, each actuator includes a main piston 1 and a subsidiary piston 2, both of which are controlled by a servo valve 3, which is actuated by an electromechanical torque motor 4 to which position demand signals 10 are applied through an electronic amplifier 5. As will be apparent, the pistons 1 and 2 will move in opposite directions upon displacement of the servo valve 3. The main piston 1 and the subsidiary piston 2 are respectively provided with position transducers 6 and 7, the outputs of which are summed at 8, the combined positional signal being compared in a comparator 9 with the demand positional signal 10. An error between the position demand signal 10 and the summed position feedback signal 8 results in an amplified negative feedback signal being passed to the torque motor 4 to displace the valve 3 in the appropriate direction to produce movement of the main and/or subsidiary piston in the servo to correct the error.

The pistons 1 of the three actuators are rigidly coupled together, being fixed to a beam 12 carrying the output member 13. The pistons 2 are connected to the arms of a three armed lever 14, which constitutes an averaging member and which has a central ball at point 15 accommodated in a socket in a fixed reactor member.

Each of the pistons 2 operates on a spring box 11 whose neutral position corresponds to the mid-stroke or neutral position of the piston 2. When all of the pistons 2 are in the neutral position, the three-armed lever 14 lies in a plane normal to the axis of the cylinders.

The allowable stroke of each subsidiary piston 2 is arranged to accommodate the maximum anticipated disparity between channels as a result of manufacturing tolerances. At the limits of this travel, switches 16 and 17 are provided for fault indication. The system operates as follows:

Each of the three complete servo loops will receive position demands 10 which, under normal conditions, may differ from each other to the extent permitted by manufacturing tolerances. Since the pistons 1 are rigidly connected, they must all take up a common position. The position demanded is, however, equated to the sum of the main and subsidiary piston positions and accordingly the disparity between position demands will appear as a difference in the position of the three subsidiary pistons 2 with respect to each other. The signals from the transducers 7 are effective to so modify the combined positional signals at 8, and thereby the output signals from the comparators 9, that the output member 13 is displaced in accordance with the average of the position demand signals 10 to the three actuators. The average of the subsidiary piston positions is referred to the fixed casing at the point 15. The spring boxes 11 will be partially compressed as a result of the displacement of the pistons 2 from their central position.

Should a hardover fault occur in one of the three channels the summed position demand for the relevant channel will differ from the summed demands for the remaining two channels and the subsidiary piston 2 in the failed channel will move to the limit of its available displacement thus closing the switch 16 or 17 and operating a warning light. After this piston 2 has reached the limit of its displacement the fault condition may continue to direct fluid in the incorrect sense to the associated main piston 1, but the latter will be overpowered on a force basis by the correctly signalled pistons 1 of the other two channels.

A further typical fault arises from loss of fluid supply to one channel. In this event the associated piston 2 is restrained in its central position by the spring box 11 and the pistons 2 of the remaining channels are provided with reaction points by means of the three-armed lever 14 which is restrained also at the casing attachment point 15.

The pistons 1 and 2 together with their transducers 6 and 7 of the remaining channels are permitted, by suitable movement of the three-armed lever 14 to take up their divided summed lengths and the average of these lengths is referred to the casing attachment point 15. An indeterminate dead zone region within the range of disparity between these channels is avoided.

Yet another fault arises when a servo position loop functions correctly but the command to it is faulty in the sense that zero displacement is continuously signalled. Under these conditions and in the presence of a position demand in the remaining channels the piston 1 in the failed channel is overpowered by the pistons 1 of the other channels. Because the distance between the pistons 1 and 2 of the failed channel is constant this will result in the piston 2 of the failed channel being progressively displaced toward the available limit of its travel. This latter displacement is fed into the averaging lever 14 and results in application of a displacement of reduced magnitude and in the sense to reduce the intended output to the pistons 2 of the remaining channels. Thus there is a zone of reduced gearing between the electrical demand signal and the actual output displacement, this zone being limited to the permitted displacement of the piston 2 in the failed channel. Beyond this permitted displacement no further movement of the averaging mechanism takes place and the displacement of the output member 13 reverts to the original relationship with the electrical position signal.

The various signals being generated in the present position control servo system and their effect on associated structure is set forth in the following mathematical derivation:

Referring to the FIG. 3, under zero input signal conditions, the pistons 1 and 2 in each channel are spaced apart by a distance $x$. In normal operation, in response to an input signal, say, $\delta y$, pistons 2 remain stationary while pistons 1 are displaced by a distance $\delta \chi$. If, for example, as described above a fault arises in the servo position loop for the uppermost actuator in FIG. 3 in the sense that zero displacement is continuously signalled while the other two channels are fed with signals $\delta y$, then there will be a tendency for the postons 1 of the actuators for the two normally-operating channels to be displaced by an amount $\delta \chi$ to make the separation between the pistons 1 and 2 correspond to $x+\delta x$. The piston 1 of the faulty uppermost channel will also tend to be displaced by a distance $\delta x$ by virtue of its rigid connection to the other pistons 1 and as the uppermost channel is subjected to a zero-displacement input signal the piston 2 of the uppermost actuator will tend to move with the piston 1 through a distance $\delta x$, thereby maintaining the separation of the pistons 1 and 2 at $x$. The forward displacement of the piston 2 of the uppermost actuator would tend to produce by virtue of the averaging lever 14 rearward displacements of $\delta x/2$ of the pistons 2 of the other two actuators, with the result that the initial displacement $\delta x$ of the two pistons 1 of these two actuators would be reduced by $\delta x/2$. Clearly, the magnitude of the final displacement of the output member 13 will be reduced.

Thus, mathematically, if $\delta y$ is the displacement of the output member in response to input signals requiring incremental piston separations of 0, $\delta x$, $\delta x$ for the three actuators, and $\delta z_1$, $\delta z_2$ and $\delta z_3$ are the incremental displacements of the pistons 2 of the three actuators, then $$\delta y + \delta z_1 = 0$$
$$\delta y + \delta z_2 = \delta x$$
$$\delta y + \delta z_3 = \delta x$$

summing these $$3\delta y + (\delta z_1 + \delta z_2 + \delta z_3) = 2\delta x$$

but $$\delta z_1 + \delta z_2 + \delta z_3 = 0$$

therefore $$\delta y = 2\delta x/3$$

That is to say, the displacement of the output member 13 is reduced to ⅔ of the required displacement $\delta x$.

When the uppermost channel in FIG. 3 continuously produces a "hardover" signal a maximum separation of the two pistons 1 and 2 is required. For the purpose of explanation it is first to be assumed that the input signals $\delta v$ to the other channels are such as to produce displacements $\delta x$ of their pistons 1 and that the input signals to the upper channel requires a displacement of $2\delta x$. As the upper piston 1 of the uppermost actuator is overridden by the other two pistons 1 and displaces only a distance $\delta x$, the piston 2 of the uppermost actuator must displace rearwardly by a distance $\delta x$ causing a forward displacement of $\delta x/2$ of each of the other two pistons 2, thereby increasing the forward displacement of the associated pistons 1.

Considered mathematically, and using the same symbols as those previously employed $$\delta y + \delta z_1 = 2\delta x$$
$$\delta y + \delta z_2 = \delta x$$
$$\delta y + \delta z_3 = \delta x$$

summing these $$3\delta y + (\delta z_1 + \delta z_2 + \delta z_3) = 4\delta x$$

therefore, $$\delta y = \delta x/3$$

That is to say, the displacement of the output member 13 is increased to $\frac{4}{3}$ of the required displacement $\delta x$. With a "hardover" fault in the uppermost channel the piston 2 will, of course, reach the limit of its travel causing the closing of switch 17 and the operating of a warning light.

Figure 4:
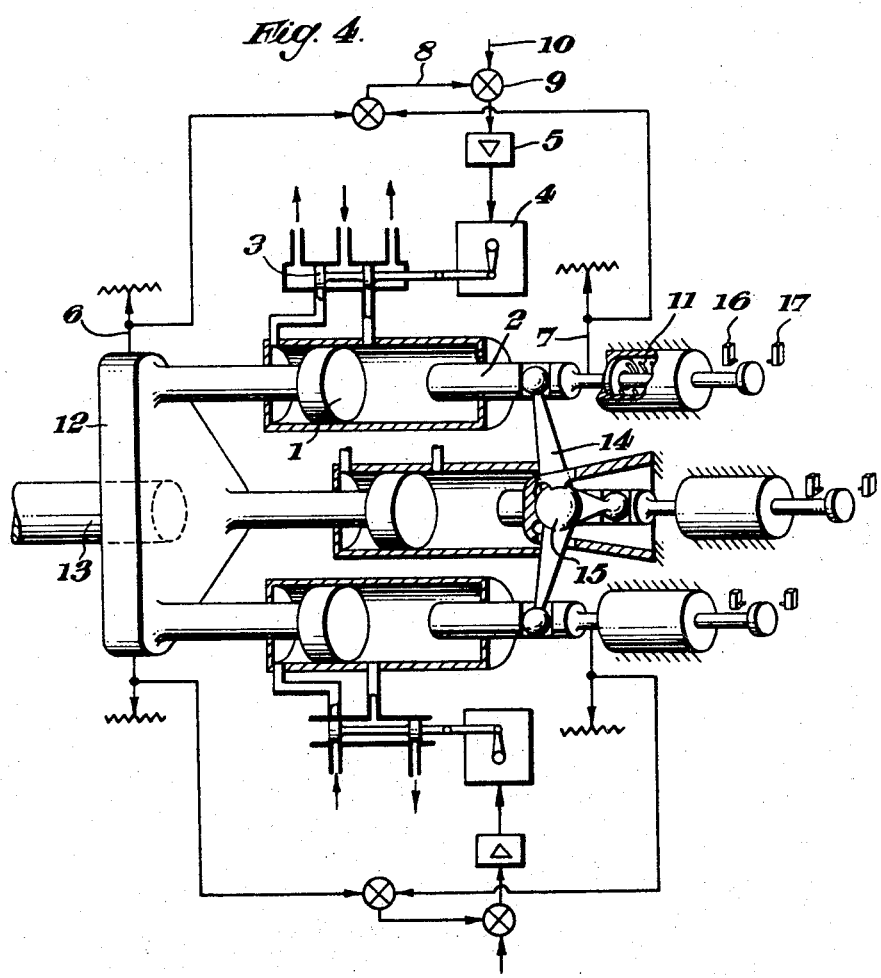

The system shown in FIG. 4 is generally similar to that just described, but in this case the swept volume of the subsidiary pistons 2 relative to that of the main pistons 1 is further reduced by reducing the subsidiary piston area. Typically to cater for a 10% disparity between input signals, the swept volume of the subsidiary piston would be only 3% of that of the main piston but the gearing of the electrical position feedback 7 from the subsidiary piston would be arranged to provide 10% of the total summed signals as before. By this means the size of the springs 11 required to provide a reaction point against displacement due to output load after failure of hydraulic supply in one channel is reduced.

In the system shown in FIG. 5 the rigidly coupled main pistons 1 are physically disassociated from the subsidiary pistons 2 and are coupled to each other coaxially in a tandem manner. The common output member 13 is the piston rod of this triplex jack.

The coupling of the subsidiary pistons 2 is as before via the averaging three-armed lever 14 and the hydraulic and electrical feedback connections are identical with those of FIG. 3. In fact, this arrangement is functionally identical with that of FIG. 3. The same considerations affecting the choice of swept volume for the subsidiary pistons 2 apply as in the case of the embodiment described in FIG. 4.

In a further embodiment shown in FIG. 6, the two relatively movable portions of each of the three jacks are the body and the piston respectively instead of two pistons within one body as in the case of FIG. 3. In this case one of the movable portions of each jack, say the piston 1, is rigidly coupled to the corresponding members of the other two jacks and the relatively extendable bodies 2 are coupled to each other by the averaging lever 14 constrained at the point 15. In this case the summing principle is inherent in the displacement of the jack and a single position transducer 6 is sufficient.

What is claimed is:

1. A position control servo system comprising three actuators each of which includes two relatively movable members, the relative displacement of which is a function of an input signal applied to the actuator, a displacement averaging mechanism, and means for comparing the relative displacement between the two relatively movable members with the input signal and for correcting any discrepancy between them, one of the relatively movable members of each actuator being rigidly connected to an output member common to the three actuators and the other relatively movable member of each actuator being coupled to said displacement averaging mechanism, and a warning device defining the actual limits of the maximum displacement of said other of the relatively movable members of each actuator corresponding substantially to the maximum tolerable difference between any two demand input signals.

2. A position control servo system comprising three actuators each of which includes two relatively movable members, said two movable members of each actuator comprising a main piston and a subsidiary piston arranged in opposition in a cylinder, the relative displacement of said members being a function of an input signal applied to the actuator, each said actuator comprising means responsive to the input signal to control the flow of fluid to and from the space in the cylinder between the opposed main and subsidiary pistons, a displacement averaging mechanism and means for comparing the relative displacement between the two relatively movable members with the input signal and for correcting any discrepancy between them, one of the relatively movable members of each actuator being rigidly connected to an output member common to the three actuators and the other relatively movable member of each actuator being coupled to a said displacement averaging mechanism, and a warning device defining the actual limits of the maximum displacement of said other of the relatively movable members of each actuator corresponding substantially to the maximum tolerable difference between any two demand input signals.

3. A system according to claim 2, wherein the cylinders are spaced laterally from each other with their longitudinal axes parallel, wherein each main piston is provided with a piston rod which extends from the cylinder in one direction, the piston rods of the main pistons being rigidly connected at their ends to a common plate to which is attached the said output member, and wherein each subsidiary piston is provided with a piston rod extending from the cylinder in the opposite direction and connected to the displacement averaging mechanism.

4. A system according to claim 2, wherein the three main pistons are fixedly mounted on a common piston rod connected to said output member and are slidable within coaxially arranged separate main cylinders, wherein the subsidiary pistons are arranged within subsidiary cylinders remote from the main cylinders and connected thereto by fluid lines and wherein the subsidiary pistons are provided with piston rods connected to the displacement averaging mechanism.

5. A system according to claim 3, wherein the displacement averaging mechanism comprises a three-armed lever, the arms of which extend radially from a central portion which is pivotally mounted at a point which is fixed in relation to the main frame of the systems, the arms being arranged with equiangular spacing and being pivotally connected at their ends to the piston rods of the subsidiary pistons.

6. A system according to claim 3, wherein the demand input signal to each actuator is an electrical signal, wherein position transducers are provided for generating electrical feedback signals representative of the displacements of the two pistons of each actuator and wherein means are provided for adding together the feedback signals to produce a combined feedback signal and applying the combined feedback signal to the input of the actuator as a negative feedback signal to produce a modified input signal.

7. A system according to claim 6, wherein each actuator includes an amplifier to which the modified input signal is applied and an electromechanical torque motor responsive to the output of the amplifier to operate a spool valve controlling the supply of fluid to and from the cylinder or cylinders.

8. A system according to claim 6, wherein the subsidiary piston of each actuator is of a smaller cross-sectional area than that of the main piston, and wherein means are provided for modifying the feedback signal representative of the subsidiary piston displacement to compensate for the difference in areas.

9. A system according to claim 1, wherein the two relatively movable members of each actuator comprise a cylinder and a piston slidable therein and each actuator comprises means responsive to the input signal to control the flow of fluid to and from the cylinder.

10. A system according to claim 9, wherein the cylinders are spaced laterally from each other with their longitudinal axes parallel, wherein each piston is provided with a piston rod extending from one end of the cylinder, the piston rods being rigidly connected at their ends to a common plate to which the said output member is attached and wherein the other ends of the cylinders are connected to the displacement averaging mechanism.

11. A system according to claim 10, wherein the displacement averaging mechanism comprises a three-arm lever, the arms of which extend radially from a central portion which is pivotally mounted at a point which is fixed in relation to the main frame of the system, the arms being arranged with equiangular spacing and being pivotally connected at their ends to rods extending from the said other ends of the cylinders.

12. A system according to claim 2, a spring device having a neutral position for each of the relatively movable members connected to the displacement averaging mechanism, and means connecting each of said spring devices to its relatively movable member so that the neutral position corresponds to the mid-stroke position of the movable member.

13. A system according to claim 12, wherein each of the relatively movable members connected to the displacement averaging mechanism is limited to movement between two limiting positions, and a limit switch connected in a fault indication circuit located at each of the limiting positions and responsive to the limit movement of each of said movable members.

14. A position control servo system comprising three actuators each of which includes two relatively movable members the relative displacement of which is representative of the input signal applied to the actuator, and means for comparing the relative displacement between the two movable members with the input demand signal and for correcting any discrepancy between them, a displacement averaging mechanism, one of the relatively movable members of each actuator being rigidly connected to an output member common to the three actuators and the other relatively movable member of each actuator being coupled to said displacement averaging mechanism, and a warning device defining the actual limits of the maximum displacement of said other relatively movable member of each actuator corresponding substantially to the maximum tolerable difference between any two demand input signals.

15. A system according to claim 14, wherein the displacement averaging mechanism comprises a pivotally displaceable member mounted for pivotal movement about a fixed pivot, and wherein the said other relatively movable members of the three actuators are pivotally connected at spaced positions to said pivotal member.

16. A system according to claim 14, wherein the demand input signal to each actuator is an electrical signal, wherein means are provided for generating an electrical feedback signal representative of the relative displacement of the two movable members of each actuator, and wherein means are provided for applying said feedback signal to the input of the actuator as a negative fedback signal to produce a modified input signal.

17. A system according to claim 14, wherein said displacement averaging mechanism comprises a three-armed lever, the arms of which extend radially with equiangular spacing from a central portion, means pivotally mounting said central portion on said fixed main frame, and means pivotally connecting the radially outer ends of said arms to said others of the relatively movable members.

18. A system according to claim 4, wherein the displacement averaging mechanism comprises a three-armed lever, the arms of which extend radially from a central portion which is pivotally mounted at a point which is fixed in relation to the main frame of the system, the arms being arranged with equiangular spacing and being pivotally connected at their ends to the piston rods of the subsidiary pistons.

19. A system according to claim 4, wherein the demand input signal to each actuator is an electrical signal, wherein position transducers are provided for generating electrical feedback signals representative of the displacements of the two pistons of each actuator and wherein means are provided for adding together the feedback signals to produce a combined feedback signal and applying the combined feedback signal to the input of the actuator as a negative feedback signal to produce a modified input signal.

References Cited

UNITED STATES PATENTS

| | | | |
|---|---|---|---|
| 3,054,039 | 9/1962 | Meredith | 244—77 M |
| 3,190,185 | 6/1965 | Rasmussen | 91—363 A |
| 3,242,822 | 3/1966 | Barltrop | 91—411 A1 |
| 3,351,315 | 11/1967 | Carson et al. | 91—363 A |

FOREIGN PATENTS 1,225,963   6/1960   Germany.

PAUL E. MASLOUSKY, *Primary Examiner.*